Sept. 5, 1967 G. D. DOLAND 3,340,423
SINGLE STAGE VERTICAL SWEEP CIRCUIT
Filed April 2, 1964
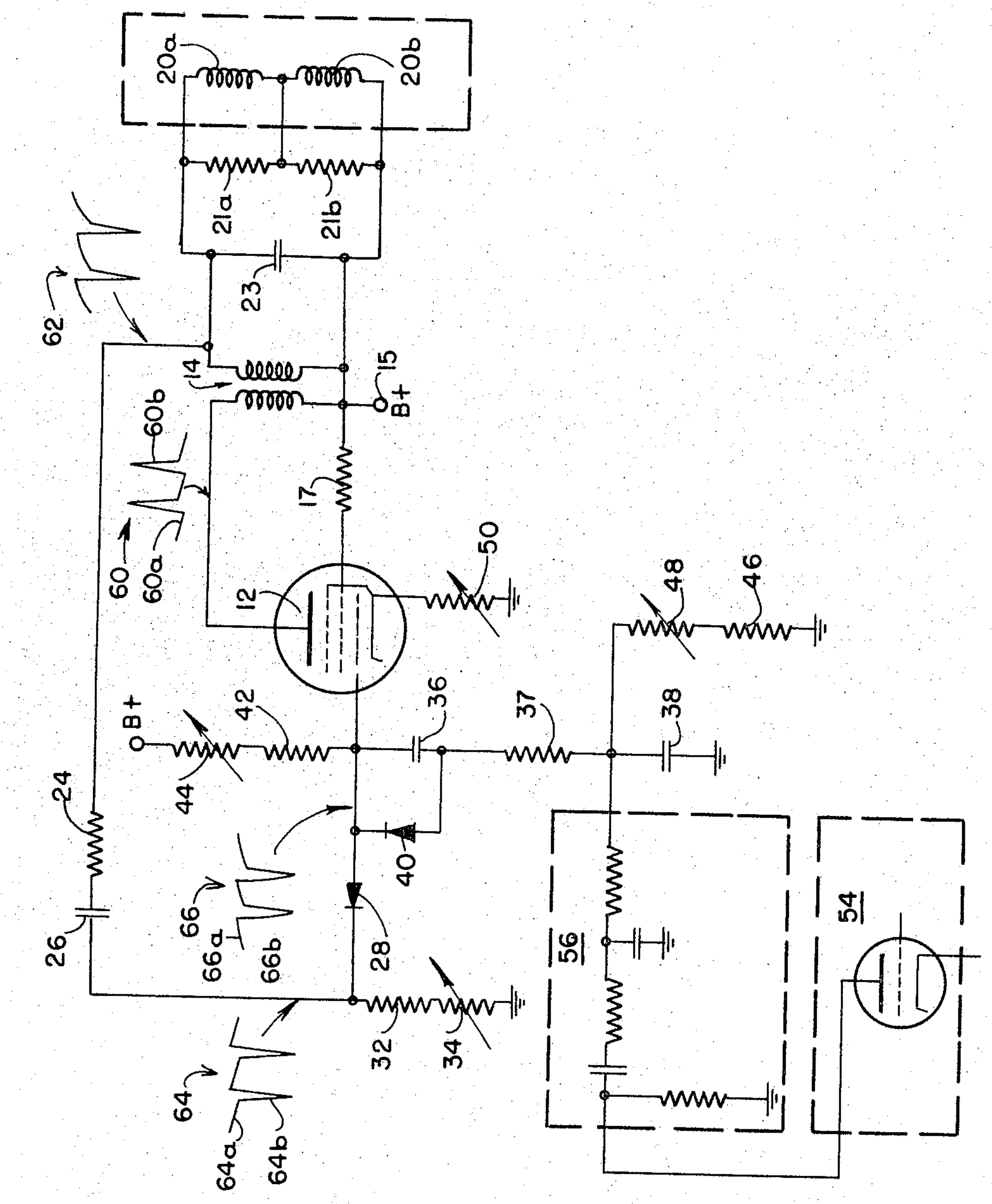
INVENTOR.
George D. Doland
BY Mueller & Aichele
ATTYS.

United States Patent Office 3,340,423

Patented Sept. 5, 1967

3,340,423

SINGLE STAGE VERTICAL SWEEP CIRCUIT

George D. Doland, Mount Prospect, Ill., assignor to Motorola, Inc., Franklin Park, Ill., a corporation of Illinois Filed Apr. 2, 1964, Ser. No. 356,840
4 Claims. (Cl. 315—27)

This invention relates to sawtooth signal generators, and more particularly to a signal generator suited for use in the cathode ray tube beam deflecting system of a television receiver.

Most practical present day vertical deflection systems for deflecting the electron beam of a cathode ray tube employ two stages of multi-element vacuum tubes; an oscillator tube for generating the desired waveforms and an output tube for driving the deflection yoke associated with the cathode ray tube. A number of self-oscillating, single-stage systems have been proposed, but in the main have been relatively inefficient and have presented problems as to stability and reliability of operation. Thus, single stage vertical deflection systems have not been widely accepted for use in mass-produced home entertainment television receivers.

It is therefore an object of the present invention to provide an improved single-stage deflection system for television receivers.

Another object is to provide an simple and efficient single-stage vertical deflection system to simplify production and minimize the cost of home entertainment television receivers.

A further object of the invention is to provide a simple, economical single-stage vertical deflection system for home entertainment television receivers in which the vertical hold, and the picture size and linearity controls may be readily adjusted over a wide range without undue circuit interaction.

A still further object of the invention is to provide an improved and simplified single-stage vertical deflection system for home entertainment television receivers which is stable in operation, preventing objectionable picture size changes and loss of vertical hold in the presence of line voltage variations.

A feature of the invention is the provision of a single stage self-oscillating deflection system including a multi-element electron tube having a regenerative feedback loop coupled between an output circuit and the control grid electrode of the tube, and having a unidirectional conductive device connected in series in the feedback loop to provide isolation between the size and linearity and the frequency determining circuit elements.

Another feature, in a vertical deflection system of the described type, is the provision of a wave shaping network including a capacitor connected in shunt with the control grid of the tube and isolated from the frequency determining circuit elements of the feedback loop by a series connected diode. The capacitor is charged to provide a controlling waveform during the trace portion of the deflection wave, and discharged through the diode to cut the tube off during the retrace portion of the deflection wave.

A further feature is the provision, in a vertical deflection system of the above-described type, of an additional stabilizing diode connected in shunt with the capacitor of the wave shaping network, with the mentioned diodes rectifying pulses occurring during the retrace portion of the deflection wave to provide a fixed bias for the tube.

A still further feature of the invention is the provision, in a deflection circuit of the type described, of controls for adjustment of frequency, linearity, and size with a minimum of circuit interaction.

In accordance with the present invention there is provided a single-stage vertical deflection system including a multi-element vacuum tube for supplying vertical deflection waves to the yokes of a cathode ray tube. Output deflection waves are coupled by a network including a first capacitor to one electrode of a semiconductor diode, and the other electrode of the diode is connected to the control grid electrode of the tube to complete a regenerative feedback loop. The electrode of the diode common with the first capacitor is returned to a reference potential such as ground through variable resistance means. The control grid electrode of the tube common with other electrode of the diode is provided with a wave shaping network including a second capacitor, with the second capacitor being charged from a DC supply through a high impedance to provide a controlling waveform during the trace portion of the deflection wave. This capacitor in the wave shaping network is adapted to be discharged by the diode during the retrace portion of the deflection wave. Thus, the described circuit provides a self-oscillating system, with the tube cutoff during retrace and conducting during the trace portion of the deflection wave. The frequency of recycling is established by the time constant between the capacitor in the feedback network and the variable resistance means shunting it and one electrode of the diode to ground.

The capacitor in the wave shaping network connected to the control grid electrode of the tube is shunted with a second diode to provide clamping for added stability of operation. An RC network returns the second capacitor and the second diode to a reference potential such as ground, and in conjunction with the first mentioned diode, rectifies the retrace portion of the deflection wave to provide a negative bias voltage for the control grid of the tube. A variable resistor in the charging impedance path for the capacitor in the wave shaping network provides size control, and a variable resistor in shunt in the RC network providing negative bias voltage functions as a linearity control. Additional linearity control may be obtained by a variable resistance providing degeneration in the cathode return of the tube.

The accompanying drawing is a schematic representation of a vertical deflection system for a television receiver constructed in accordance with the invention.

Referring now to the drawing, the single-stage vertical deflection system of the invention includes vacuum tube pentode 12, having its anode electrode connected to one side of the primary winding of output transformer 14. The other side of the primary winding of output transformer 14 is connected to B+ at terminal 15. Resistor 17 is connected between terminal 15 and the screen grid electrode of tube 12 to provide screen grid voltage therefor.

The secondary winding of output transformer 14 is connected across vertical deflection windings 20_a_ and 20_b_ of the vertical deflection yoke for the cathode ray tube of the receiver. It is to be understood that the deflection yoke is located around the neck of the cathode ray tube to provide beam deflection in the conventional manner. Ordinarily the face of the cathode ray tube is somewhat curved and a so-called "cosine" yoke is used so that approximately linear sawtooth current is required for scanning purposes. Resistors 21_a_ and 21_b_ are connected across deflection windings 20_a_ and 20_b_, respectively, to provide balance for the DC centering current through the yoke, which current may be provided by connecting one side of the secondary winding of output transformer 14 to B+ at terminal 15. Capacitor 23 shunts secondary winding of transformer 14 for horizontal deflection signals picked up by windings 20_a_ and 20_b_.

One side of the secondary winding of output transformer 14 is connected by resistor 24, capacitor 26 and diode 28 to the control grid electrode of tube 12. Capacitor 26 provides DC blocking, and further, in conjunction with resistors 32 and 34 provides an RC network having a time constant which determines the rate at which tube 12 is recycled to provide a self-oscillating deflection system in the manner hereinafter described. The value of resistor 24 is small with respect to resistors 32 and 34, and its function is to limit the peak inverse voltage developed across diode 28 during the retrace portion of the vertical deflection wave generated by tube 12. Resistors 32 and 34 return the junction point between diode 28 and capacitor 26 to a reference potential such as ground, and by making resistor 34 variable the recycling frequency of tube 12 may be controlled to thereby provide a vertical hold adjustment.

The control grid electrode of tube 12 is returned to ground reference potential by the network including capacitor 36, resistor 37 and capacitor 38. Diode 40 is connected across capacitor 36. As hereinafter described, a negative voltage is provided at the junction of diode 28 and diode 40 to provide control grid bias for tube 12. The side of capacitor 36 common to the junction of control grid of tube 12 and diode 28 is also connected to B+ through resistors 42 and 44. Capacitor 36 is charged from B+ through these resistors during the trace portion of the deflection wave generated by tube 12, and these resistors are large-valued so that capacitor 36 is charged from an apparent constant current source to approximate the rising sawtooth wave required. Resistor 44 is variable to provide a size control. The junction point between resistor 37 and capacitor 38 is shunted to ground by resistors 46 and 48. Resistor 48 is variable so that the DC bias for tube 12 can be adjusted for linearity control. The cathode electrode of tube 12 is returned to ground through resistor 50, providing degeneration for additional linearity. By making resistor 50 variable a further linearity control is possible. In a practically constructed circuit either resistor 46 or resistor 50 may be fixed, with the other variable for linearity control.

Synchronizing pulses, derived from synchronizing signal separator circuit 54 in the usual manner, are coupled to the junction point between resistor 37 and capacitor 38 by integrating network 56. This in turn couples a synchronizing signal to the control grid of tube 12 to lock the frequency of recycling of the system at vertical deflection frequency, usually 60 c.p.s. Alternately the synchronizing signal may be applied to the junction of capacitor 26 and diode 28.

In operation, output transformer 14 and deflection windings **20*a* and 20*b* present an essentially resistive load to tube 12 in the presence of a generally linear sawtooth wave appearing at its control grid electrode during the trace portion of the deflection wave generated by the system. Because of nonlinearities appearing in the yoke, transformer and tube, a practical circuit should apply a wave having a somewhat increasing slope. Retrace or recycling of the system starts when the current in the load decreases to an extent that allows the stored energy of the transformer and yoke to be released as a heavily damped ringing operation to produce retrace pulses. This normally occurs at the end of trace, when the control grid of tube 12 reaches zero bias or when a synchronizing signal is applied. The retrace pulse thus derived from the output load is regeneratively coupled to the control grid of tube 12 to periodically drive it into cutoff in an abrupt manner, subsequent to which a charging wave is again applied to the control grid electrode of tube 12**.

Accordingly, a deflection wave having waveform 60 is coupled between the anode electrode of tube 12 and deflection windings **20*a* and 20*b* by transformer 14. Vertical deflection wave 60 includes a linear trace portion 60*a* and a sharply peaked, high amplitude retrace portion 60*b*. The polarity of wave 60 is reversed by transformer 14, resulting in waveform 62 at its secondary winding. The polarity of wave 62 is the same as that appearing at the control grid electrode of tube 12, resulting in the required regenerative action. Wave 62 is coupled by resistor 24 and capacitor 26 to the junction of diode 28 and resistor 32, appearing at that point as waveform 64. Diode 28 is poled to be conductive in the presence of negative-going retrace pulses 64*b* by connecting its cathode electrode to capacitor 26 and its anode electrode to the control grid electrode of tube 12. Thus, waveform 64 causes the cathode electrode of diode 28 to go instantaneously negative, discharging capacitor 36 through resistors 32 and 34 to ground during retrace portion 64*b*. The corresponding waveform 66, having trace portion 66*a* and retrace portion 66*b* appears at the control grid electrode of tube 12. Capacitor 36 is charged from B+ through resistors 42 and 44, applying a positive-going signal to the control grid electrode of tube 12 during trace, as shown by portion 66*a* of waveform 66. It is to be noted that a negative DC bias is also applied to the control grid electrode of tube 12, as subsequently described, and accordingly the polarity of waveform 66** is with respect to this bias.

When capacitor 36 is discharged, the side of capacitor 26 common to the cathode electrode of diode 28 goes positive almost instantaneously, cutting diode 28 off again. With diode 28 cutoff, capacitor 36 is again charged from B+ through resistors 42 and 44, and concurrently capacitor 26 is discharged to ground through resistors 32 and 34. This action is indicated by trace portions **64*a* and 66*a* of waveforms 64 and 66, respectively. Thus diode 28 may be considered a switch for periodically discharging capacitor 36, at which time tube 12 is cutoff to provide the retrace portion of the deflection wave, and subsequently allowing capacitor 36** to be charged positively, thereby providing the trace portion of the deflection wave.

As mentioned, a fixed negative bias is applied to the control grid electrode of tube 12 to maintain it cutoff during retrace. To this end, diode 28 acts as a rectifier for the negative-going retrace pulses **66*b* of waveform 66, and filtering is provided by capacitor 38 and resistors 46 and 48. Diode 40 is connected across capacitor 36 to provide clamping for the control grid electrode of tube 12. Accordingly, a negative voltage is developed across capacitor 38 and resistors 46 and 48, which voltage serves as a DC bias for the grid electrode of tube 12. It is to be noted that the charging circuit for capacitor 36 is effectively floated between B+ and the negative grid bias for tube 12 so that an expanded charging curve and hence increased linearity is realized during the trace portion of the deflection wave. Thus by making resistor 48 variable the DC biasing level and accordingly the limits of this range may be adjusted to provide linearity control. Preferably the bias for tube 12 is adjusted so that it is cutoff at the beginning of trace and the positive voltage developed across capacitor 36 reaches zero bias at the end of trace. Variable resistor 44 determines the voltage at which capacitor 36 is charged at the end of trace, thus providing size control. Additional linearity control may be provided by inserting a relatively small valued variable resistor 50 in the cathode return of tube 12** to provide a degree of degeneration.

Since the feedback loop including capacitor 26 and resistor 24 is regenerative in its action, the above described circuit is self-oscillating. The frequency at which the system recycles is determined primarily by the time constant of capacitor 26 and resistors 32 and 34. By making resistor 34 variable, a hold or frequency control is provided for the system. It may be seen that diode 28 provides isolation between the frequency determining portions and the size and linearity determining portions of the system, thus making adjustment less critical. This arrangement is particularly advantageous for circuits incorporated into mass-produced home entertainment TV receivers.

To provide synchronization to lock the deflection system with the synchronizing signal component of the received television signal, synchronizing pulses are derived from synchronizing signal separator circuit 54 and are applied, via integrating network 56, to the side of capacitor 36 common with the cathode electrode of diode 40. Alternately synchronizing signals may be applied to the cathode electrode of diode 28. Such signals tend to trigger the regenerative cutoff action of the system so that recycling is independent of minor component variations arising from normal usage. Thus, within the adjustment range of resistor 34, the system is locked to the synchronizing signal component of the received television signal, typically 60 cycles per second.

In a practically constructed circuit according to the foregoing, the following component values may be used:

| | | |
|---|---|---|
| Tube **12** (Phillips) | | PL500 |
| B+ | volts | 140 |
| Resistor **17** | ohms | 150 |
| Resistor **24** | do | 5600 |
| Capacitor **26** | mfd | .033 |
| Diodes **28, 40** fast switching (silicon). | | |
| Resistor **32** | ohms | 150,000 |
| Resistor **34** | do | 500,000 |
| Capacitor **36** | mfd | .068 |
| Resistor **37** | ohms | 2200 |
| Capacitor **38** | mfd | .5 |
| Resistor **42** | ohms | 820,000 |
| Resistor **44** | do | 500,000 |
| Resistor **46** | do | 100,000 |
| Resistor **48** | do | 250,000 |
| Resistor **50** | do | 50 |

The invention provides, therefore, an improved deflection system particularly advantageous for use with home entertainment receivers. The system utilizes a single vacuum tube, providing a single-stage, self-oscillating deflection system which is stable and reliable in operation and is simple and economical to construct. The frequency determining portions of the system are isolated by a series diode in the regenerative feedback network producing self-oscillations, and convenient controls are provided for vertical hold, size, and linearity adjustments with a minimum of circuit interaction.

I claim:

1. A signal generating circuit to produce beam deflection waves for a cathode ray tube, which waves have a trace portion and a retrace portion, including in combination; an electron control device having control and output electrodes, an output load coupled to said output electrode, said load including inductor means to release stored energy during the retrace portion of the deflection waves, a feedback network including a first diode and first capacitor means series coupled between said output load and said control electrode, network means coupled to said control grid electrode and including second capacitor means to be charged to establish a controlling waveform at said control electrode, a second diode coupled in shunt with said second capacitor means, first circuit means for charging said second capacitor means during the trace portion of the deflection waves, and second circuit means for providing a discharge path for said second capacitor means, said first diode operable to discharge said second capacitor means through said second circuit means during the retrace portion of the deflection waves.

2. A signal generating circuit to produce beam deflecting waves for a cathode ray tube, which waves have a trace portion and a retrace portion, including in combination, an electron valve having control grid and output electrodes, an output load coupled to said output electrode, said load including inductor means to release stored energy during the retrace portion of the deflection waves, a diode having first and second electrodes, means including a first capacitor coupling the first electrode of said diode to said output load, said second diode electrode being connected to said control grid electrode, with said diode and said first capacitor providing a regenerative feedback path between said output load and said control grid electrode, network means including a second capacitor coupled between said control grid electrode and a reference potential, said network means further including a second diode connected in shunt with said second capacitor, first resistor means connected to said control grid electrode and adapted to supply a charging voltage to said second capacitor, and second resistor means connecting said first diode electrode to a reference potential, with said second capacitor being charged during the trace portion of the deflection waves and being discharged through said diode and said second resistor means during the retrace portion of the deflection waves.

3. The combination of claim 2 wherein said network means includes an RC circuit connected between said second capacitor and said reference potential thereby to develop grid bias for said electron valve by rectification of the retrace portion of the deflection wave by said first diode.

4. A signal generating circuit to provide beam deflection waves for a cathode ray tube, which waves have a trace portion and a retrace portion, including in combination, an electron valve having at least anode, cathode and control grid electrodes, an output load connected to said anode electrode, said load including inductor means to release stored energy during the retrace portion of the deflection waves, a first diode having anode and cathode electrodes, means including a first capacitor coupling the cathode electrode of said first diode to said output load, with the anode electrode of said first diode being coupled to the control grid electrode of said electron valve, said diode and said first capacitor providing regenerative feedback between said output load and the control grid electrode of said electron valve, first variable resistor means connecting the cathode electrode of said electron valve to a reference potential, network means including a second capacitor connected between the control grid electrode of said electron valve and a reference potential, a second diode connected shunt with said second capacitor, second variable resistance means for applying a charging voltage to said second capacitor to establish a controlling waveform at the control grid electrode of said electron valve during the trace portion of the deflection waves, and third variable resistor means returning the cathode electrode of said first diode to a reference potential, said first diode operable to discharge said capacitor to said third variable resistor to a reference potential to thereby cutoff said electron valve during the retrace portion of the deflection waves.

References Cited

UNITED STATES PATENTS

| | | | |
|---|---|---|---|
| 2,926,284 | 2/1960 | Finkelstein | 315—27 |
| 3,206,634 | 9/1965 | Hellstrom | 315—27 |

JOHN W. CALDWELL, *Acting Primary Examiner.*

DAVID G. REDINBAUGH, *Examiner.*

T. A. GALLAGHER, J. A. O'BRIEN, *Assistant Examiners.*